US008274928B2

(12) United States Patent
Dykema et al.

(10) Patent No.: US 8,274,928 B2
(45) Date of Patent: Sep. 25, 2012

(54) WIRELESS MESH NETWORK (75) Inventors: Kurt A. Dykema, Holland, MI (US);
Brent K. Bouws, Holland, MI (US);
Thomas J. Doman, Holland, MI (US);
Lawrence F. Leete, III, Spring Lake, MI (US); William C. Schenck, Zeeland, MI (US); Warren E. Guthrie, West Olive, MI (US)

(73) Assignee: Light Corporation, Grand Haven, MI (US)

( * ) Notice: Subject to any disclaimer, the term of this patent is extended or adjusted under 35 U.S.C. 154(b) by 1087 days.

(21) Appl. No.: 12/141,759

(22) Filed: Jun. 18, 2008

(65) Prior Publication Data
US 2008/0310350 A1 Dec. 18, 2008

Related U.S. Application Data (60) Provisional application No. 60/944,690, filed on Jun. 18, 2007.

(51) Int. Cl.
*H04W 4/00* (2009.01)
*H04L 12/28* (2006.01)
*H04L 12/40* (2006.01)

(52) U.S. Cl. ......... 370/328; 370/390; 370/392; 370/406

(58) Field of Classification Search .................. 370/328, 370/390, 392, 406
See application file for complete search history.

(56) References Cited

U.S. PATENT DOCUMENTS

| 6,859,644 | B2* | 2/2005 | Wang ........................ 455/159.2 |
| 7,225,243 | B1* | 5/2007 | Wilson ........................ 709/223 |
| 7,355,991 | B2* | 4/2008 | Huang et al. .................. 370/312 |
| 7,423,985 | B1* | 9/2008 | Hill ............................ 370/310.1 |
| 2004/0259558 | A1* | 12/2004 | Skafidas et al. ............... 455/450 |
| 2005/0124346 | A1* | 6/2005 | Corbett et al. ................ 455/446 |
| 2006/0245360 | A1* | 11/2006 | Ensor et al. ................... 370/238 |
| 2007/0189252 | A1* | 8/2007 | Kawakami ..................... 370/338 |
| 2008/0013502 | A1* | 1/2008 | Clark ........................... 370/338 |
| 2008/0032705 | A1* | 2/2008 | Patel et al. ................... 455/456.1 |
| 2008/0153423 | A1* | 6/2008 | Armstrong et al. ........ 455/67.14 |
| 2008/0218334 | A1* | 9/2008 | Pitchers et al. ............ 340/539.1 |
| 2008/0232334 | A1* | 9/2008 | Das et al. ..................... 370/337 |
| 2008/0240112 | A1* | 10/2008 | Muqattash et al. ...... 370/395.31 |
| 2008/0253327 | A1* | 10/2008 | Kohvakka et al. ............ 370/330 |
| 2008/0253386 | A1* | 10/2008 | Barum ......................... 370/406 |
| 2008/0291855 | A1* | 11/2008 | Bata et al. .................... 370/311 |

(Continued)

OTHER PUBLICATIONS

Jason Lester Hill, System Architechture for Wireless Sensor Networks, Spring 2003, Iniversity of California, Berkeley CA, pp. 38.*
SensiNet Wireless Security and Data Integrity, 2007, Sensicast Systems, Inc., Needham, United States.

(Continued)

*Primary Examiner* — John Blanton
(74) *Attorney, Agent, or Firm* — Warner Norcross & Judd LLP (57) ABSTRACT

A wireless mesh network where a portion of the nodes have reduced receive sensitivity. The negative effects of the density of the wireless mesh network, such as interference, are reduced when fewer nodes receive messages to rebroadcast. In an alternative embodiment, some of the nodes of the mesh network are configured to not rebroadcast even if they receive a message. A method for configuring a dense mesh network is also provided. As many nodes as possible are discovered and registered in the network. Node characteristics of those nodes are adjusted to reduce or eliminate the negative effects of the dense mesh network so that additional nodes may be discovered and registered.

23 Claims, 7 Drawing Sheets

U.S. PATENT DOCUMENTS

| | | | |
|---|---|---|---|
| 2009/0109885 A1* | 4/2009 | Fonseca et al. | 370/311 |
| 2009/0201844 A1* | 8/2009 | Bhatti et al. | 370/312 |
| 2010/0022262 A1* | 1/2010 | Aue | 455/501 |
| 2010/0026479 A1* | 2/2010 | Tran | 340/501 |

OTHER PUBLICATIONS

Comparing SensiNet to ZigBee, Sensicast Systems—Mar. 21, 2005, pp. 1-5, Sensicast Systems, Inc, Needham, United States.

* cited by examiner

WIRELESS MESH NETWORK

BACKGROUND OF THE INVENTION

The present invention relates to wireless mesh networks, and more particularly the use of such networks within lighting systems.

Wireless mesh networks that control lighting or other devices are well known. A mesh network is made up of a number of short-range, low-cost nodes. The nodes communicate with one another, typically using a mesh network protocol that involves broadcasting a message and having all nodes rebroadcast all received messages.

Mesh networks have limitations. Nodes rebroadcasting at the same time in a small region on the same channel may interfere with each other. The more nodes rebroadcasting, the more interference and the smaller the chance that a message will be heard. Ultimately, the interference may result in unacceptable message latency or in some nodes not receiving the broadcast messages at all. This effect is called the dense mesh network dilemma.

Attempts have been made to reduce or eliminate the negative effects of a dense mesh network. However, none of them have proven to be satisfactory. Limiting the frequency and length of messages may lessen the negative effects, but it is impractical in some applications, such as time sensitive or data heavy applications. Of course, the distance between nodes may be increased to alleviate the dense nature of the mesh network, however, many applications require closer spacing than is feasible. The number of radio channels used in the mesh network protocol may be increased to reduce the negative effects of a dense mesh network. However, hardware which communicates over multiple channels typically is more complex and costly.

All of these attempts to eliminate or reduce the dense network density dilemma require compromises that may be unacceptable in some applications.

SUMMARY OF THE INVENTION

The present invention is directed to a mesh network where a portion of the nodes have their node characteristics adjusted to reduce or eliminate the negative effects of a dense mesh network. In a first embodiment, all of the nodes of the mesh network are configured to have a reduced receive sensitivity. In a second embodiment, some of the nodes of the mesh network are configured to have a relatively reduced receive sensitivity with respect to the other nodes in the mesh network. In a third embodiment, some of the nodes of the mesh network are configured to not rebroadcast.

In another embodiment, the present invention provides a method generally including: discovering new nodes in the mesh network, registering the new nodes, and adjusting as necessary some of the node characteristics to reduce or eliminate the negative effects of the dense mesh network so that new nodes may be more readily and accurately discovered and registered.

These and other objects, advantages, and features of the invention will be more fully understood and appreciated by reference to the detailed description of the current embodiments and the drawings.

DESCRIPTION OF THE CURRENT EMBODIMENTS

The present invention generally provides a system and method for configuring a dense mesh network, sustaining a healthy mesh network, or both.

I. Dense Mesh Network Configuration

Figure 1:
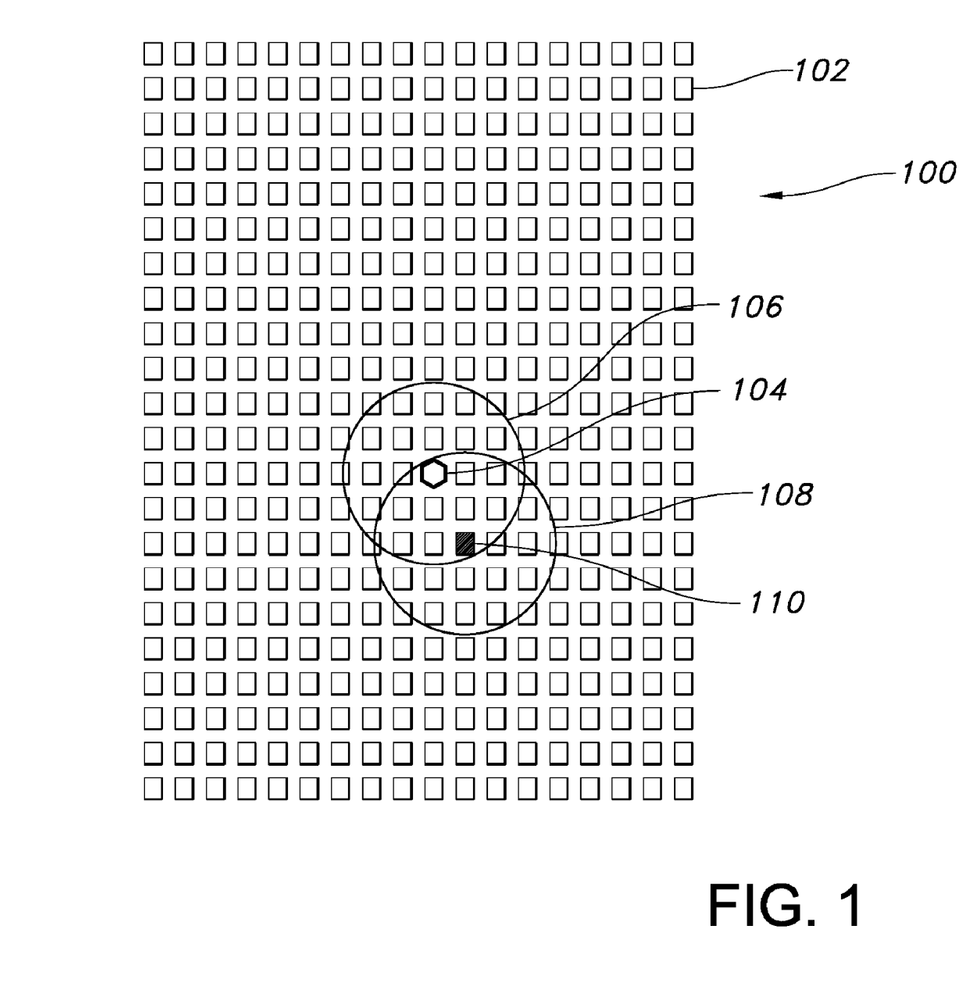
FIG. 1 is a plan view of the mesh network according to a first embodiment of the present invention.
Figure 2:
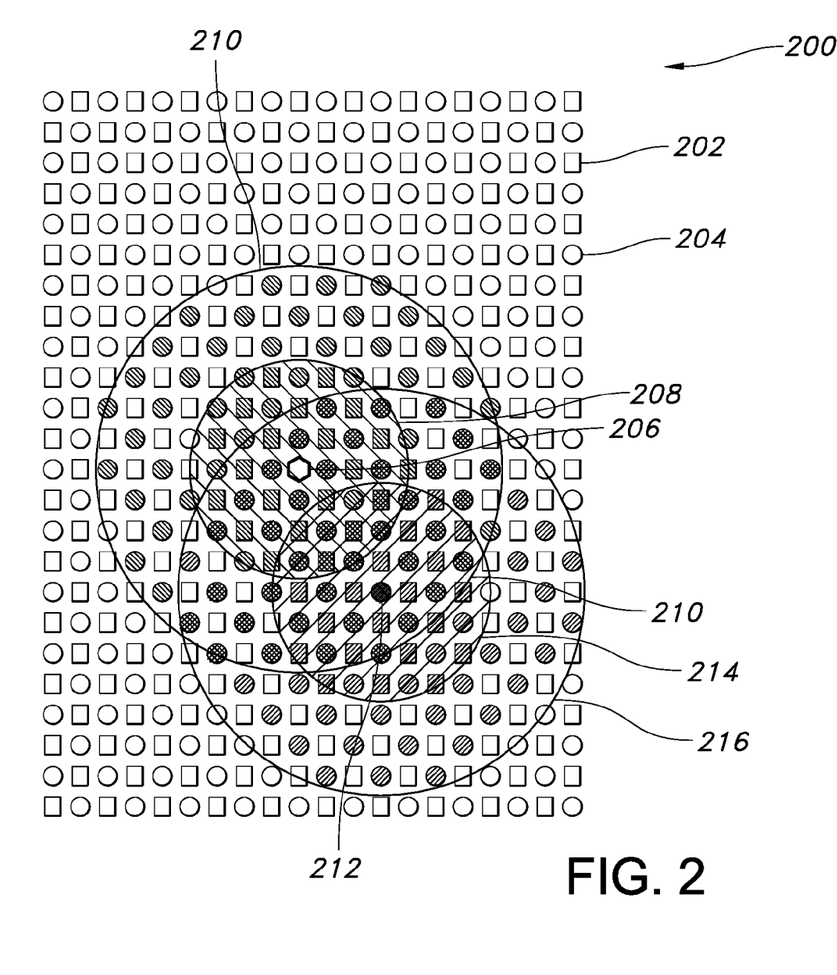
FIG. 2 is a plan view of the mesh network according to a second embodiment of the present invention.
Figure 3:
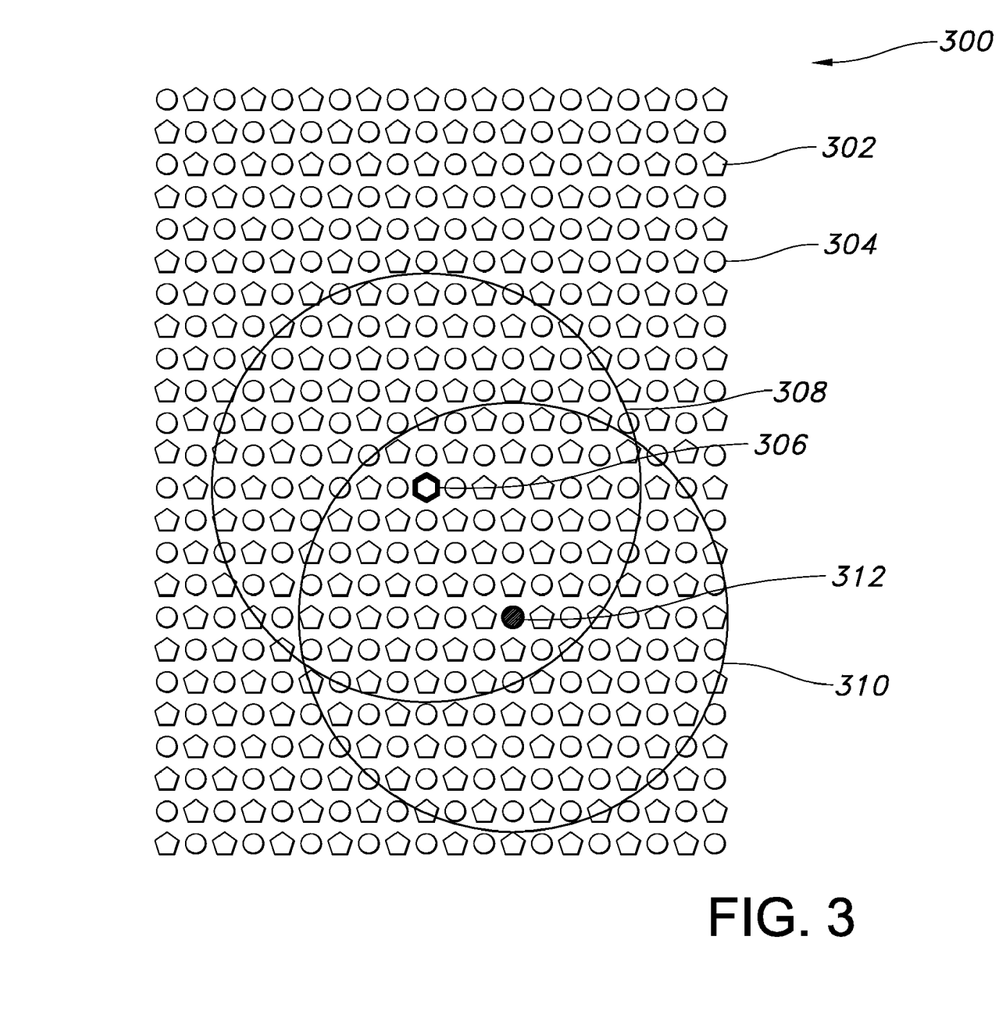
FIG. 3 is a plan view of the mesh network according to a third embodiment of the present invention.

Various embodiments of a mesh network configured to reduce the negative effects of a dense mesh network are shown in FIGS. 1-3. A method for configuring a dense mesh network is described in FIG. 4 and FIGS. 5-6. Each of the embodiments includes a gateway and a number of mesh network nodes. In a first embodiment, all of the nodes are configured to have a lower receive sensitivity. In a second embodiment, only a portion of the nodes have a lower receive sensitivity. In a third embodiment, a portion of the nodes are configured to not rebroadcast. Alternative embodiments may include mesh networks where all or a portion of the nodes have a lower receive sensitivity and a portion of the nodes are set not to rebroadcast.

In each embodiment of the system, some or all of the negative effects of having many nodes that are physically proximate to one another attempting to broadcast substantially simultaneously are alleviated. Although the embodiments discussed below are described with reference to a relatively small number of nodes for the purpose of illustration, it should be appreciated that the scope of the invention is not so limited, and may include mesh networks with thousands or more nodes.

Each of the embodiments described below is described within the context of a wireless lighting control system. However, the invention may be implemented in essentially any mesh network to overcome issues that arise due to the nodes being positioned too close to one another. For example, applications where mesh networks that could have density issues include: building monitoring and control, industrial monitoring and control, military communications and reconnaissance, medical monitoring, consumer electronics equipment interconnections, automobiles, public service communications, automatic meter reading, environmental monitoring, and security systems, just to name a few.

In the described embodiments, the nodes are positioned in a uniform pattern for simplicity and clarity. However, in alternative embodiments, the position of the nodes may vary widely, even among the mesh network itself. For example, some portions of the mesh network may be dense while other portions may be sparse. The distance between each node need not be uniform, instead, the position of the nodes may vary from application to application. For example, nodes may be distributed to suit a particular building, budget or application scheme. In the current wireless lighting control application, node placement is largely dictated by the need for the nodes to be installed at a maximum of 150 feet from the nearest ballast controller, among other things. In the described embodiments, the nodes are at a fixed location; however, in alternative embodiments, the nodes may be mobile or movable.

The gateway is responsible for transmitting messages to the mesh network that the gateway receives or generates. Each of the embodiments below includes a single gateway that is located near the center of the nodes. Alternative embodiments, may include additional gateways or the gateway may be positioned differently, for example, near or outside the edge of the mesh network.

Signals propagate through the mesh network according to a mesh network protocol. Mesh networks are well known in the art and therefore will not be discussed in detail. In the current embodiment, each node listens and attempts to rebroadcast any message it receives. For example, when the gateway sends a signal, each of the nodes in range of the gateway receives the signal and attempts to rebroadcast that message, which in turn allows more nodes to hear the signal and rebroadcast it. This process is repeated until the signal reaches all of the nodes in the mesh network. Although the embodiments described below operate using the ZigBee mesh network protocol, alternative embodiments may use a different mesh network protocol. Although signals are initiated from the gateway in the embodiments described below, in alternative embodiments, any node in mesh network could initiate a broadcast.

In the embodiments described below, the gateway is an Ethernet or Cellular to ZigBee gateway and the nodes are lighting control modules that each control three ballast triacs. The light control modules include an occupancy sensor to detect presence and a light sensor to detect the amount of ambient light. This information may be shared among the mesh network and the gateway. The gateway includes lighting control software which issues commands to the light control modules to adjust the lighting. Although not depicted, the lighting control system may include various light switches, touch screens, and keypads which communicate with the mesh network to control the lighting.

In the described embodiments, the hardware for each of the lighting control modules is substantially identical, but contains a number of node characteristics which may be modified in software. The transmitter power, receive sensitivity, and whether or not the node should rebroadcast are examples of such node characteristics. Nodes need not be configured prior to installation, instead the nodes may be configured during or after installation to have the appropriate node characteristics.

A. First Embodiment

A mesh network configured in accordance with a first embodiment of the invention is shown in FIG. 1 and generally designated 100. The mesh network 100 includes a gateway 104 and a number of nodes 102. Each of the nodes 102 has a reduced receive sensitivity such that the number of nodes that hear a broadcast is low enough that any negative effects from the dense network is reduced or eliminated.

The nodes 102 inside range 106 are capable of hearing a signal broadcast from the gateway 104. The size of the range 106 is determined by a number of factors. Those factors include, among other things, the transmit power of the transmitting node, the receive sensitivity of the listening node and the propagation loss of the signal. In alternative embodiments, the range 106 may be adjusted to be larger or smaller by adjusting one or more of these or other factors. In the current embodiment, the range 106 is shown as substantially circular because all of the factors are constant, including the receive sensitivity of each node. However, in alternative embodiments, any of the factors, including the receive sensitivities may vary from node to node, which could cause the radius and shape of the range 106 to vary.

Once nodes 102 inside range 106 hear the signal broadcast from the gateway, each node attempts to rebroadcast the message according to the mesh network protocol. In the current embodiment, each node waits a bounded random amount of time, called the back off time, before attempting to send a message. However, because the number of nodes inside range 106 is relatively small due to the reduced receive sensitivity, there is less chance for the rebroadcasts to cause interference with one another.

In the current embodiment, node 110 hears the signal broadcast from the gateway and attempts to re-broadcast. The nodes inside range 108 can hear the signal being rebroadcast from node 110. Range 108 is similar to range 106 in this embodiment and depends on the same factors. They are a similar size because, in this embodiment, the transmit power, receive sensitivity and loss propagation are all equal for each node.

Other nodes that hear the rebroadcast signal will attempt to rebroadcast the signal. Each rebroadcast allows more and more of the mesh network to hear the signal. In general, the cycle continues until all of the nodes in the mesh network have heard the signal. The mesh networking protocol may define certain conditions for when a signal has reached the entire mesh network.

B. Second Embodiment

A second embodiment of the mesh network is shown in FIG. 2 and generally designated 200. In this embodiment, some of the nodes 204 have normal receive sensitivity and some of the nodes 202 have a relatively reduced receive sensitivity.

Nodes 202, 204 within range 208 are able to hear a command issued by the gateway 206. In ring 210 only the normal nodes 204, without lower receive sensitivity, are able to hear the signal broadcast from the gateway 206. The receive sensitivity of nodes 202 outside of range 208 is too low to hear the signal broadcast from the gateway 206.

In the current embodiment, node 212 hears the signal broadcast from the gateway and attempts to re-broadcast. All of the nodes 202, 204 inside range 214 can hear the signal being rebroadcast from node 212. In ring 216 only the normal nodes 204, without lower receive sensitivity, are able to hear the signal broadcast from the gateway. The receive sensitivity of nodes 202 outside of range 214 is too low to hear the signal broadcast from the rebroadcast node 212.

Although not shown in the drawings, it should be understood that each of the nodes that receives a broadcast signal, either from the gateway 206 or another node 202, 204 will attempt to rebroadcast the signal according to the mesh network protocol. Eventually all of the nodes in the mesh network will hear the signal.

In the current embodiment, range 208 and range 214 are similar to each other because the node characteristics for the normal nodes are the same and the node characteristics for the lower receive sensitivity nodes are the same. Ring 210 and ring 216 are also similarly sized and shaped for the same reason. In alternative embodiments, the normal nodes may have a range or tolerance of node characteristics and the lower receive sensitivity nodes may have a separate range or tolerance of node characteristics, which could alter the size and shape of ranges 208, 214 and rings 210, 216.

In the current embodiment, the ranges 208, 214 and rings 210, 216 are useful for illustrating how the mesh network can be effectively "thinned out". However, in some embodiments, it may be difficult or impossible to draw clear boundaries showing which nodes are within range and which are not. For example, in embodiments where the receive sensitivity characteristics are not uniformly tiered across the mesh network, it may be difficult to predict which nodes would hear a broadcast and which nodes would not.

As in the first embodiment, the nodes 202, 204 in the current embodiment are light control modules which control lights in a wireless lighting control system. In the current embodiment, the nodes 202, 204 are arranged in a checkerboard pattern with every other node having a lower receive sensitivity. Other arrangements of the nodes are within the scope of the present invention and include, for example, alternating columns or rows of nodes having reduced receive sensitivity, every four out of five nodes having lower receive sensitivity, or any other configuration of nodes that tends to decrease the negative effects of a dense mesh network. As discussed above, the number and density of nodes may vary from application to application.

C. Third Embodiment

A third embodiment of the mesh network is shown in FIG. 3 and generally designated 300. The mesh network 300 includes a gateway 306 and a number of nodes 302, 304. Each of the nodes 302 has been configured to not rebroadcast, while each of the nodes 304 is normal and will rebroadcast signals it receives according to the mesh network protocol. Enough nodes are configured to not rebroadcast that negative effects from the dense network are reduced or eliminated.

All of the nodes 302, 304 inside range 308 are capable of hearing a signal broadcast from the gateway 306. However, only nodes 304 inside range 308 rebroadcast the message. Fewer nodes are rebroadcasting, so there is less chance of negative effects being an issue from nodes attempting to rebroadcast at the same time. The size of the range 308 is determined by a number of factors, which were discussed above.

Once nodes 304 inside range 308 hear the signal broadcast from the gateway 306, each node 304 attempts to rebroadcast the message according to the mesh networking protocol. In the current embodiment, node 312 hears the signal broadcast from the gateway 306 and attempts to re-broadcast. The nodes 302, 304 inside range 310 can hear the signal being rebroadcast from node 312, but only nodes 304 inside range 310 will attempt to rebroadcast the signal according to the mesh network protocol. In general, the cycle continues until all of the nodes in the mesh network have heard the signal.

The nodes 302, 304 in the current embodiment are light control modules for a wireless lighting control system. In the current embodiment, the nodes 302, 304 are arranged in a checkerboard pattern with every other node being configured not to rebroadcast. Other arrangements of the nodes are within the scope of the present invention and include, for example, alternating columns or rows of nodes configured to not rebroadcast, every four out of five nodes configured to not rebroadcast, or any other configuration of nodes that tends to decrease the negative effects of a dense mesh network. As discussed above, the number of nodes and the density of the nodes may vary from application to application.

D. Method for Configuring a Dense Mesh Network

Figure 4:
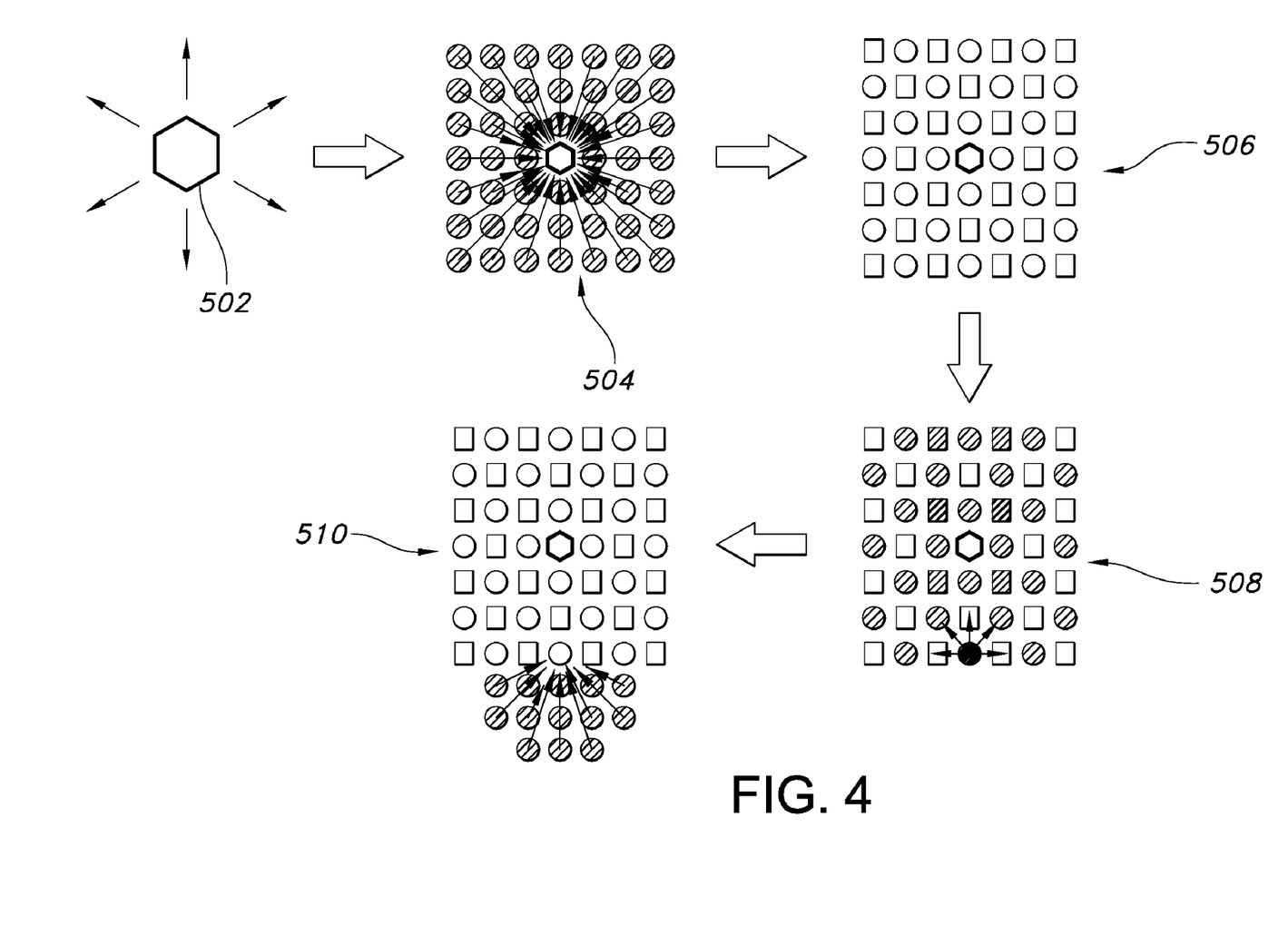
FIG. 4 is a schematic view illustrating the establishment process according to another embodiment of the present invention.
Figure 6:
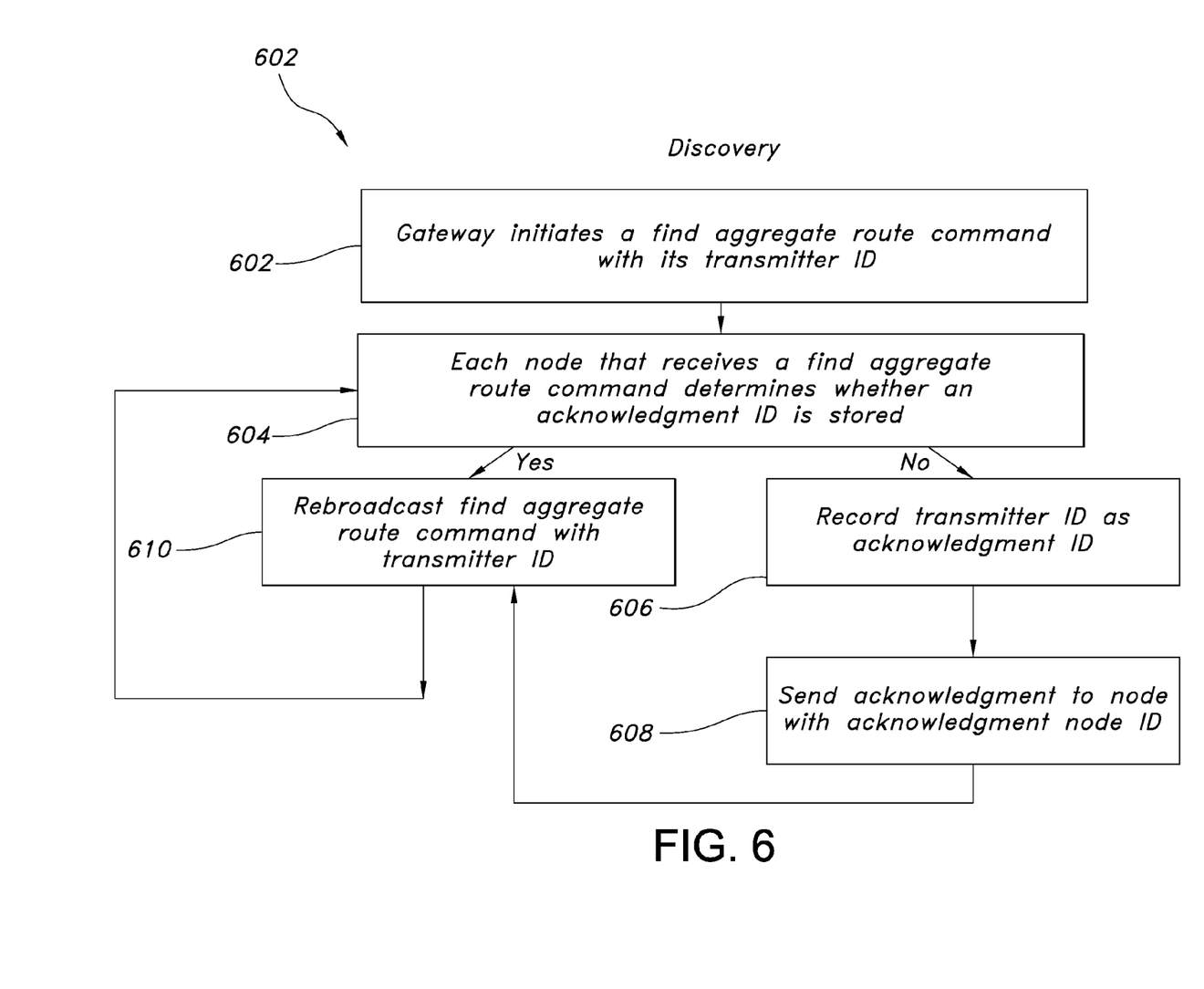
FIG. 6 is a flow chart of the discovery process according to another embodiment of the present invention.
Figure 7:
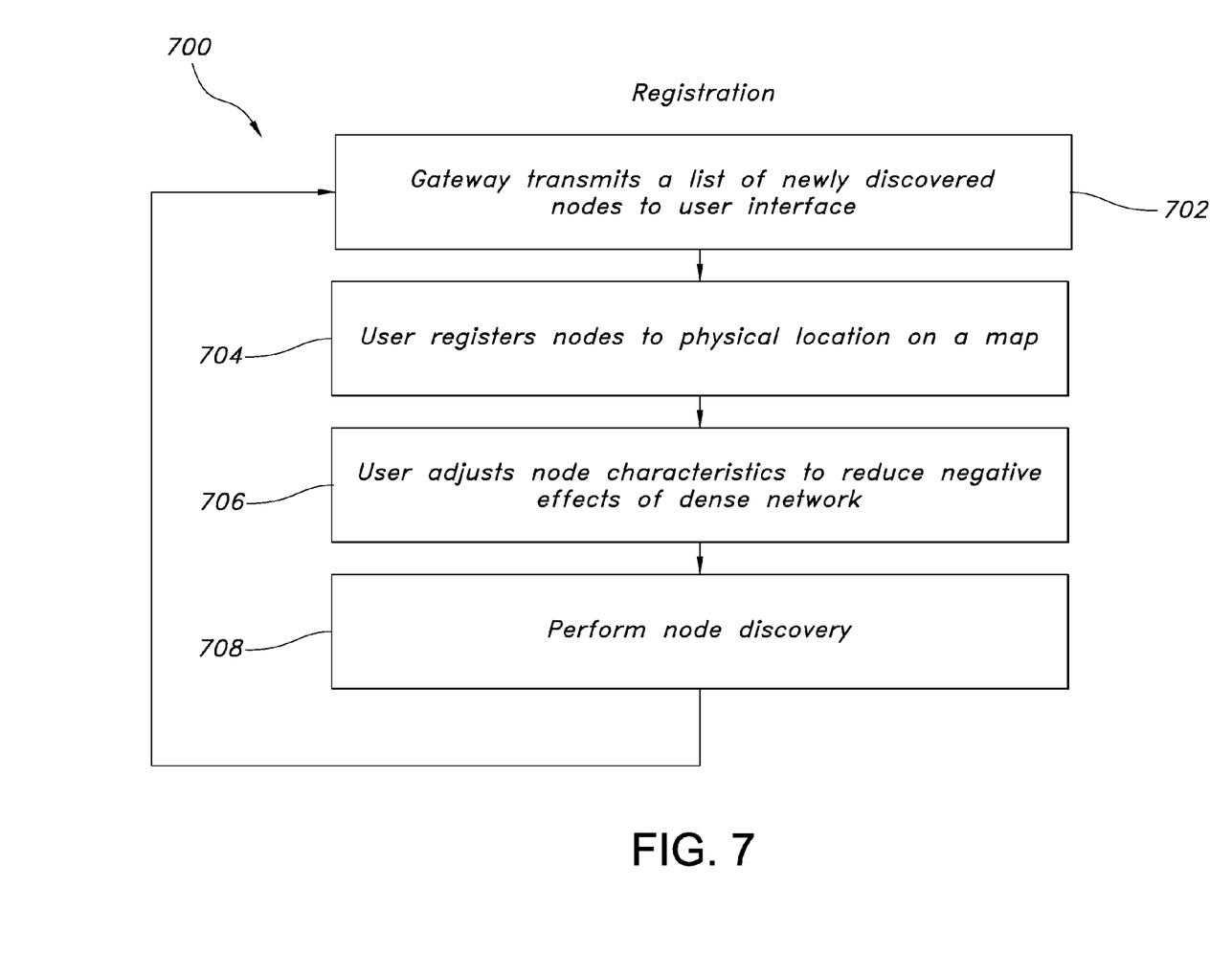
FIG. 7 is a flow chart of the registration process according to another embodiment of the present invention.

Another embodiment of the present invention includes a method for configuring a dense mesh network and is shown in FIG. 4 and FIGS. 6-7.

In one embodiment, configuring a dense network according to the present invention includes: configuring nodes to operate on a channel that is associated with the system; logically associating the nodes with the network by recording each node's unique identification code; mapping the physical location of the nodes; and assigning the appropriate characteristics of the nodes to reduce any negative effects of a dense mesh network.

Some of these steps may be performed prior to installation, however it may be difficult to impossible to know what if any negative dense mesh network effects will arise from the arrangement of the nodes prior to establishing the mesh network.

In order to establish the mesh network, first some nodes are discovered and registered, which in turn allows additional nodes to be discovered and registered. The process is repeated until the entire mesh network has been established.

In the current embodiment, discovery is initiated by a gateway that broadcasts a find aggregate route command to all the nodes within range 602. Next, each node that receives the find aggregate route command determines whether an acknowledgement ID is stored locally 604. If an acknowledge ID is not stored locally, then the transmitter ID is recorded as the acknowledgement ID and an acknowledgement is sent back to the acknowledgement ID, which will forward it to its acknowledgement ID so that it will eventually reach the gateway 606. If the acknowledgement ID is already stored or the acknowledgement has been sent, the node rebroadcasts the find aggregate route command 610 and returns to step 604. The discovery process ends when no more nodes receive the find aggregate route command.

After nodes have been discovered, the nodes may be registered. The gateway transmits a list of newly discovered nodes to a user interface 702. A user associates nodes to with their physical location on a map 704. A user adjusts various node characteristics, including receive sensitivity and whether the node should rebroadcast, to reduce or eliminate negative effects of the dense network. Discovery can now be performed again, with the possibility of finding additional nodes because the negative effects of the dense network are no longer interfering with those nodes receiving the find aggregate route command.

FIG. 4 shows the discovery and registration processes in action. First, the gateway broadcasts a find aggregate route message 502. Next, all of the nodes that receive the message report back to the gateway with an acknowledgement and attempt to rebroadcast the message. All of the nodes in the mesh network are not discovered because of the dense mesh network dilemma. The nodes that were discovered are registered, including having various node characteristics adjusted to deal with the dense mesh network dilemma 506. In this embodiment, the receive sensitivity of some nodes was lowered. The discovery process begins again, the gateway sends a find aggregate route command which is rebroadcast 508. This time, additional nodes are discovered and report back to the gateway, via the aggregate route, because the network was thinned out by altering the node characteristics of some nodes. This process may be repeated until the entire mesh network has been discovered and registered.

II. Method for Monitoring and Sustaining Network Health

Figure 5:
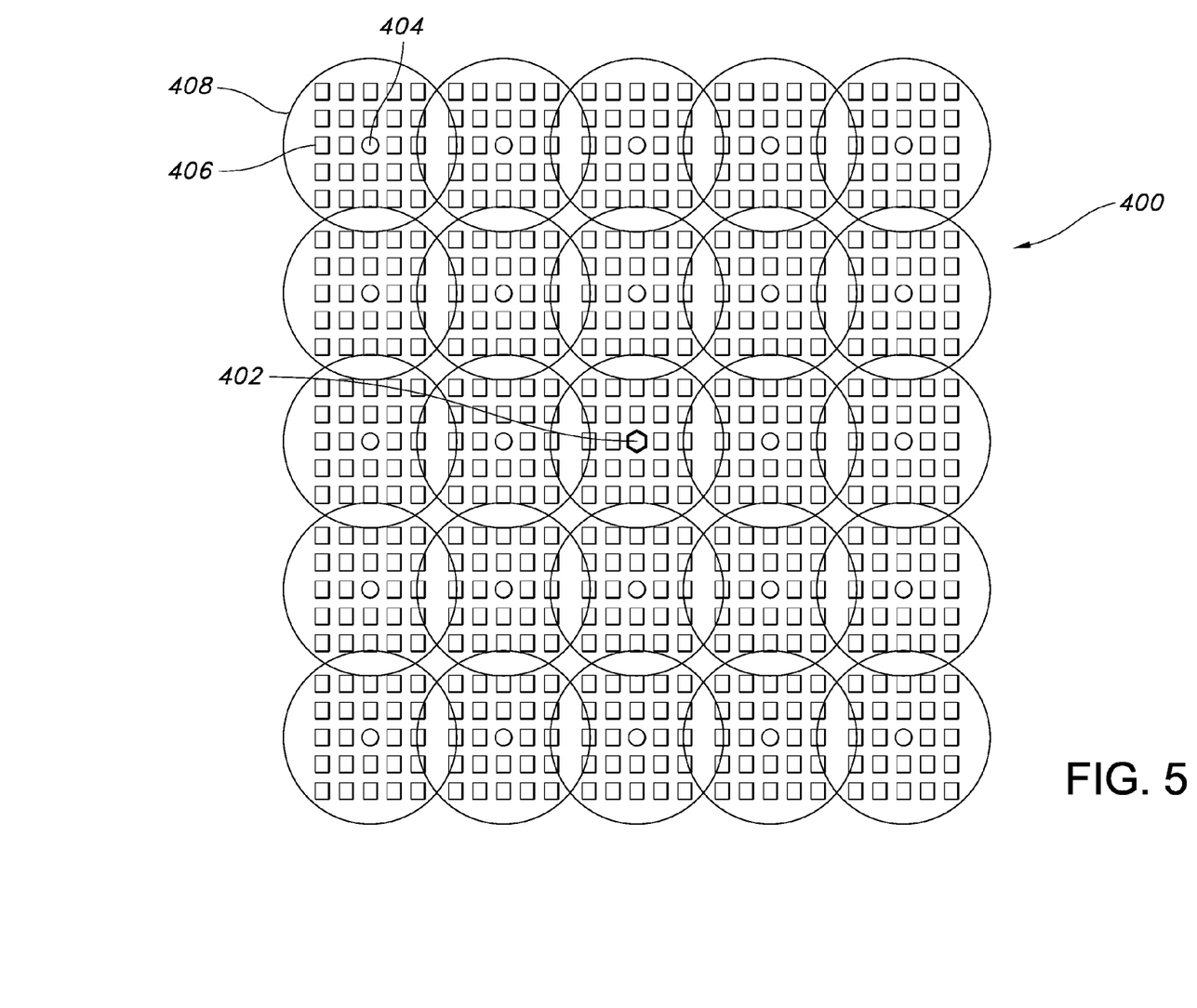
FIG. 5 is a plan view of the mesh network according to another embodiment of the present invention.

Another aspect of the present invention includes a method for monitoring and sustaining network health and is shown in FIG. 5. Mesh network health is sustained by organizing the nodes of the mesh network into three logical tiers: a gateway 402, mole nodes 404, and term nodes 406. The term nodes 406 send period heartbeat signals to mole nodes 404 and the mole nodes 404 send periodic heartbeat signals to the gateway 402. The health of the network is sustained by monitoring the heartbeat signals and issuing a channel change command if certain threshold parameters are exceeded. The threshold parameters include, but are not limited to, a number of sequential unacceptable heartbeats, an average number of unacceptable heartbeats, a number of unacceptable term heartbeats and a total number of unacceptable heartbeats.

In one embodiment, the process includes two basic modes of operation for each node: heartbeat mode, for checking system health, and network search mode, for re-establishing links to orphaned nodes. These operations work according to a set of programmable variables that have different values depending on whether the network is fully functional, or is being re-established following a channel change.

Establishing a sufficiently reliable link between a distributed set of mole nodes 404 and each of their term nodes 406 is a sufficient indication that no node is out of link range. This setup allows for redundancy so that potentially more than one link must be broken before declaring a problem.

In the event that a problem is declared, channel change commands are broadcast from the gateway 402. Each node in the mesh network should receive the channel change command. However, in the event that a broadcast channel change command is not received by a node, network search mode is entered by the wayward node.

Mole nodes 404 monitor the quality of data links from themselves to term nodes 406. Term nodes are associated with one or more mole nodes 404. In the current embodiment, this association occurs when the system is first installed. For example, in the current embodiment, all term nodes 406 within range 408 are associated with mole node 404. Each mole node 404 stores the local term node 406 associations and the gateway 402 holds all of the mole and term node 404, 406 associations.

Each mole node 404 repeatedly broadcasts a report health command to all of its term nodes 406 after a pre-determined amount of time. In the current embodiment, the broadcast occurs every 60 seconds and is programmable by a command from the gateway 404.

The mole node 404 expects to hear from each of its term nodes 406 within a pre-determined amount of time. In the current embodiment, within ten seconds. If one or more term nodes 406 do not reply, the mole node 404 will broadcast another report health command. If all terms respond to the second broadcast within the pre-determined amount of time, then the mole node will begin broadcasting repeatedly again. If all term nodes have not responded to the second broadcast, then the mole node sends a health failure message to the gateway 402 using its aggregate route.

Each mole node transmits a health heartbeat message to the gateway 402 after a pre-determined amount of time, programmable by a command from the gateway, through its aggregate route. In the current embodiment, every five minutes. In the current embodiment, each mole node 404 has a specific time-slot in which to issue the command. The time-slot is determined by a TX_DELAY of the most significant EUI byte divided by 256 and multiplied by the report interval. In alternative embodiments, it may be determined differently.

The gateway 402 controls the network health monitoring by broadcasting messages to the mole nodes 404 and the term nodes 406. The messages may include start health monitoring, stop health monitoring, download health monitoring parameters, and leave network to name a few.

In the current embodiment, the gateway 402 broadcasts the find aggregate route command after a predetermined amount of time, programmable by a graphical user interface. In the current embodiment, it broadcasts the find aggregate route command every sixty seconds. The find aggregate route command repairs and establishes aggregate routes from the mole nodes 404 and term nodes 406 back to the gateway 402.

The gateway 402 monitors the entire network and decides when to switch network channel. In the current embodiment, the gateway records problem links in a database and assembles the data suitably to be displayed in a graphical user interface.

The gateway automatically commands a channel change if certain problem threshold parameters are exceeded. In the current embodiment, problem threshold parameters include the number of sequential unacceptable heartbeats from one term or mole node; the average unacceptable heartbeats from one term or mole node; the number of unacceptable heartbeats for all term nodes associated with one or more single mole nodes; and the total number of unacceptable heartbeats.

In the current embodiment, there are two sets of problem threshold parameters: fully functional problem threshold parameters and channel change problem threshold parameters. The fully functional problem threshold parameters apply to a mesh network that has been identified as fully functional. For example, either following initialization or following a successful channel change process. The channel change parameters apply following a channel change. For example, prior to establishing a fully functional network.

If a term node 406 does not hear from a mole node within a pre-determined amount of time, programmable by a command from the gateway 402, then the term node 406 will report a no mole communication message to the gateway 402. In the current embodiment the pre-determined amount of time is sixty seconds. If the report is acknowledged, the term node 406 waits to hear from its mole node 404 or the gateway 402. If the report is not acknowledged by the gateway 402, then the term node 406 will attempt to transmit a pre-determined number of times, programmable by the gateway 402. In the current embodiment, the term node 406 makes the attempt three times, once every two minutes. If all of the attempts fail, the term node 406 will enter a network search mode.

If the gateway 402 does not hear from a mole node 404 within a pre-determined amount of time, programmable by a command from the gateway 402, then the gateway 402 will broadcast a find aggregate route command. In the current embodiment, the pre-determined amount of time is ten minutes. After the aggregate route discovery, the gateway 402 broadcasts an all moles report health command and if all mole nodes 404 do not respond within a programmable pre-determined amount of time, the gateway 402 issues a channel change command.

If the gateway 402 receives a health failure message from a mole node 404, indicating that the link from a mole node 404 to a term node 406 is unhealthy, the gateway checks if the term node 406 is reporting directly to the gateway 402. If it is, the term node 406 is still operational, but has lost mole coverage and the mole and term node associations should be repaired.

Finally, if a mole node 404 does not hear a response from any of its term nodes 406, the mole node performs a software reset and broadcasts a report health command to its term nodes 406 again. If the term nodes 406 are still not reporting, the mole node 404 attempts to broadcast the health failure message to the gateway 402.

The above description is that of the current embodiments of the invention. Various alterations and changes can be made without departing from the spirit and broader aspects of the invention.

The invention claimed is:

1. A wireless mesh network configured to reduce negative effects related to density of said wireless mesh network, said wireless mesh network comprising:
   a plurality of nodes, wherein each of said plurality of nodes is configured to receive a message within a receive range having an adjustable size and selectively rebroadcasts said received message;
   wherein said size of said receive range of each of said plurality of nodes receive range size is selected based on receive sensitivity, wherein said receive sensitivity of at least a first subset of said plurality of nodes is selected such that said adjustable size of said receive range at which a node receives a message is reduced; and
   wherein said first subset of said plurality of nodes with reduced receive range do not rebroadcast received messages, and said plurality of nodes includes a second subset of said plurality of nodes without reduced receive range that selectively rebroadcast said received messages.

2. The wireless mesh network of claim 1 wherein said first subset of said plurality of nodes includes all of said plurality of nodes.

3. The wireless mesh network of claim 1 wherein said wireless mesh network includes a second subset of said plurality of nodes wherein said receive sensitivity of said second subset is selected such that said adjustable size of said receive range of each of said plurality of nodes in said second subset is greater than in said first subset.

4. The wireless mesh network of claim 1 wherein each of said plurality of nodes includes a light control module.

5. The wireless mesh network of claim 1 wherein said first subset of said plurality of nodes are positioned relative to the remaining plurality of nodes to decrease negative effects resulting from density of said wireless mesh network.

6. A method for configuring a dense wireless mesh network including a plurality of rebroadcasting nodes to reduce negative effects related to density in said dense wireless mesh network, said method comprising:
   discovering a first subset of the plurality of rebroadcasting nodes in the dense wireless mesh network;
   registering the first subset of the plurality of rebroadcasting nodes; and
   adjusting receive sensitivity of at least one of the nodes of the first subset of said plurality of rebroadcasting nodes to reduce negative effects related to density in said dense wireless mesh network, wherein reducing receive sensitivity of at least one of the nodes of the first subset of said plurality of rebroadcasting nodes reduces messages received by said first subset of said plurality of rebroadcasting nodes, wherein reducing messages received by said first subset of said plurality of rebroadcasting nodes reduces the messages rebroadcast by the first subset of said plurality of rebroadcasting nodes;
   wherein said adjusting allows a second subset of said plurality of nodes to be discovered and registered.

7. The method for configuring a dense wireless mesh network of claim 6 wherein said first subset of said plurality of nodes includes all of said plurality of nodes.

8. The method for configuring a dense wireless mesh network of claim 6 wherein said discovering, registering, and adjusting receive sensitivity is repeated until all of the nodes in the mesh network are discovered and registered.

9. The method for configuring a dense wireless mesh network of claim 6 wherein adjusting receive sensitivity includes adjusting some of the plurality of nodes in the first subset to a different receive sensitivity than some of the other plurality of nodes in the first subset.

10. The method for configuring a dense wireless mesh network of claim 6 further comprising configuring the at least one of the nodes of said first subset of said plurality of nodes with reduced receive sensitivity to not rebroadcast received messages.

11. The method for configuring a dense wireless mesh network of claim 6 wherein said discovering includes receiving an acknowledgement ID at a gateway for each of said first subset of plurality of nodes.

12. The method for configuring a dense wireless mesh network of claim 6 wherein said registering includes transmitting a list of the subset of the plurality of nodes to a user interface and providing a user interface for associating each of the subset of the plurality of nodes with a physical location on a map whereby the user can adjust at least one of node receive sensitivity and a node rebroadcast state in the user interface to reduce the negative effects of the dense wireless mesh network.

13. A wireless mesh network for controlling lighting configured to reduce negative effects related to density of said wireless mesh network, said wireless mesh network comprising:
   a gateway for transmitting light control messages;
   a plurality of light control nodes, wherein each of said plurality of light control nodes is configured to receive a light control message within a link range and selectively rebroadcast said received light control message;
   wherein said link range of each of said plurality of light control nodes is adjustable based on receive sensitivity, wherein said receive sensitivity of at least a first subset of said plurality of light control nodes is selected to reduce negative effects related to density of said wireless mesh network; and
   wherein said first subset of said plurality of light control nodes are positioned relative to the remaining plurality of light control nodes to decrease negative effects resulting from density of said wireless mesh network.

14. The wireless mesh network of claim 13 wherein said first subset of said plurality of light control nodes includes all of said plurality of light control nodes.

15. The wireless mesh network of claim 13 wherein said wireless mesh network includes a second subset of said plurality of light control nodes wherein said receive sensitivity of said second subset is selected such that said link range of each of said plurality of light control nodes in said second subset is greater than in said first subset.

16. The wireless mesh network of claim 13 wherein a second subset of said plurality of light control nodes do not rebroadcast received messages.

17. The wireless mesh network of claim 13 wherein each of said plurality of light control nodes includes a light fixture.

18. The wireless mesh network of claim 13 wherein each of said plurality of light control nodes is electrically connected to a lighting fixture.

19. A wireless mesh network configured to reduce negative effects related to density of said wireless mesh network, said wireless mesh network comprising:
   a plurality of nodes, wherein each of said plurality of nodes is configured to receive a message within a receive range having an adjustable size and selectively rebroadcasts said received message;
   wherein said size of said receive range of each of said plurality of nodes receive range size is selected based on receive sensitivity, wherein said receive sensitivity of at least a first subset of said plurality of nodes is selected such that said adjustable size of said receive range at which a node receives a message is reduced; and wherein said first subset of said plurality of nodes are positioned relative to the remaining plurality of nodes to decrease negative effects resulting from density of said wireless mesh network.

20. The wireless mesh network of claim 19 wherein said first subset of said plurality of nodes includes all of said plurality of nodes.

21. The wireless mesh network of claim 19 wherein said wireless mesh network includes a second subset of said plurality of nodes wherein said receive sensitivity of said second subset is selected such that said adjustable size of said receive range of each of said plurality of nodes in said second subset is greater than in said first subset.

22. The wireless mesh network of claim 19 wherein said first subset of said plurality of nodes with reduced receive range do not rebroadcast received messages, and said plurality of nodes includes a second subset of said plurality of nodes without reduced receive range that selectively rebroadcast said received messages.

23. The wireless mesh network of claim 19 wherein each of said plurality of nodes includes a light control module.

\* \* \* \* \*